(12) United States Patent
Theberge et al.

(10) Patent No.: US 9,589,342 B2
(45) Date of Patent: Mar. 7, 2017

(54) METHOD OF INSPECTING IMAGES OF CONNECTORS OF OPTICAL CABLES BY USING LIVE, STILL OR STORED IMAGES

(71) Applicant: AFL Telecommunications LLC, Duncan, SC (US)

(72) Inventors: Christopher D. Theberge, Methuen, MA (US); William Thompson, Westborough, MA (US); Michael Leighton, Deerfield, NH (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/399,300

(22) PCT Filed: May 29, 2013

(86) PCT No.: PCT/US2013/043012
§ 371 (c)(1),
(2) Date: Nov. 6, 2014

(87) PCT Pub. No.: WO2013/181199
PCT Pub. Date: Dec. 5, 2013

(65) Prior Publication Data
US 2015/0117751 A1    Apr. 30, 2015

Related U.S. Application Data

(60) Provisional application No. 61/652,391, filed on May 29, 2012.

(51) Int. Cl.
*G06K 9/00* (2006.01)
*G06T 7/00* (2006.01)

(52) U.S. Cl.
CPC ............ *G06T 7/001* (2013.01); *G06T 7/0028* (2013.01); *G06T 2207/20101* (2013.01); *G06T 2207/30164* (2013.01)

(58) Field of Classification Search
CPC .... G06T 7/0002; G06T 7/0004; G06T 7/0024
See application file for complete search history.

(56) References Cited

U.S. PATENT DOCUMENTS 6,941,016 B1 *   9/2005   Wagman et al. ............. 382/199
7,162,073 B1 *   1/2007   Akgul et al. ................. 382/149
(Continued)

FOREIGN PATENT DOCUMENTS

EP          1 956 356          8/2008
EP          1956356 A1 *       8/2008
WO      2011/140352 A1        11/2011

OTHER PUBLICATIONS

International Search Report for PCT/US2013/043012 dated Dec. 6, 2014.
Written Opinion for PCT/US2013/043012 dated Dec. 6, 2014.

*Primary Examiner* — Wesley Tucker
(74) *Attorney, Agent, or Firm* — Dority & Manning, P.A.

(57) ABSTRACT

A method for inspecting connectors of multi-fiber optical cables is disclosed. The method may include receiving a plurality of images of a plurality of areas of a connector and determining, via at least a processor, matching features in two or more images according to unique visual characteristics of the images. The method further may include aligning the images, according to unique matching features of the images, and combining the images such as to obtain a combined-image of the full connector or a desired area of the connector. The combined-image of the connector may be displayed on a monitor or a display.

23 Claims, 2 Drawing Sheets

(56) References Cited

U.S. PATENT DOCUMENTS

| | | |
|---|---|---|
| 2005/0238313 A1 | 10/2005 | Clark |
| 2007/0031062 A1* | 2/2007 | Pal .................... G06F 17/30843 382/284 |
| 2008/0136895 A1* | 6/2008 | Mareachen ................ 348/14.03 |
| 2011/0268369 A1* | 11/2011 | Richards et al. ............. 382/284 |
| 2015/0130849 A1* | 5/2015 | Thompson et al. .......... 345/667 |

* cited by examiner

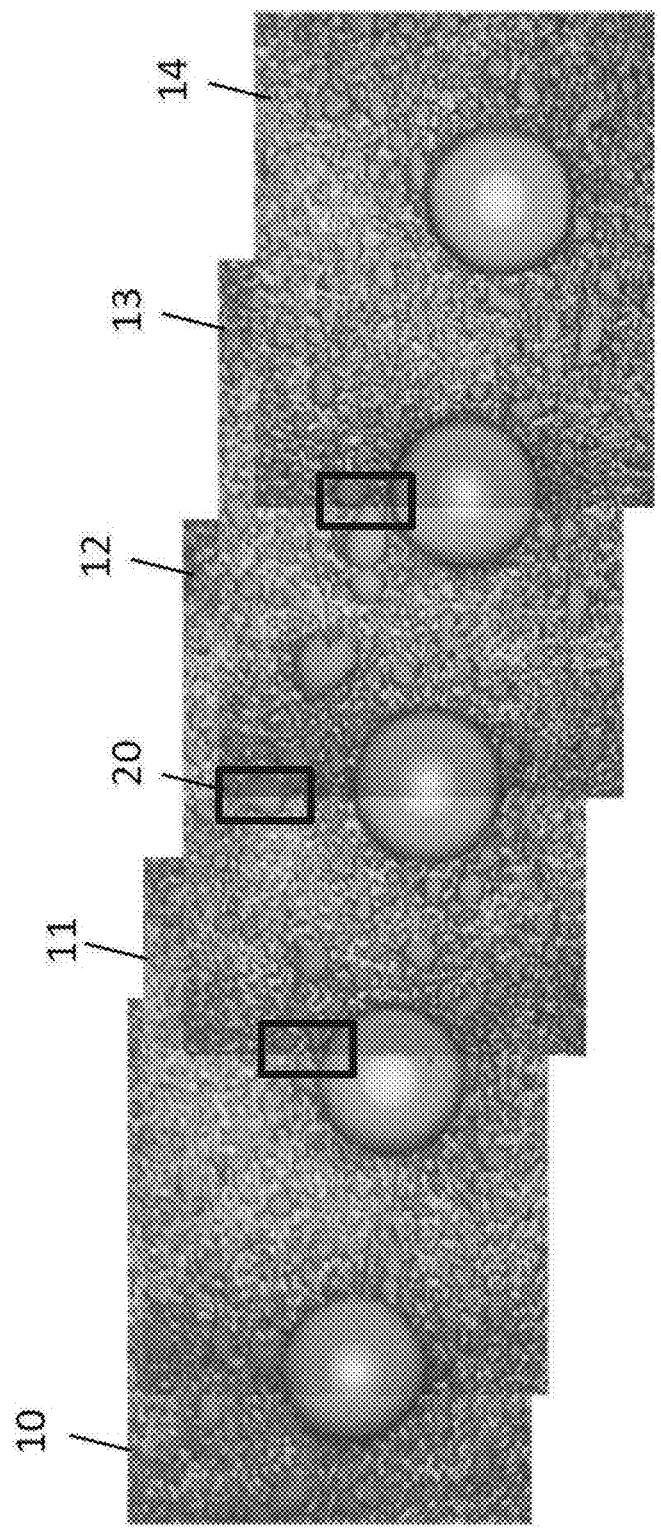

METHOD OF INSPECTING IMAGES OF CONNECTORS OF OPTICAL CABLES BY USING LIVE, STILL OR STORED IMAGES

CROSS-REFERENCE TO RELATED APPLICATIONS

This application is based upon and claims the benefit of priority from U.S. Provisional Application No. 61/652,391, filed May 29, 2012, in the United States Patent and Trademark Office, the disclosures of which are incorporated herein in its entirety by reference.

BACKGROUND

1. Field

The invention relates to a method and an apparatus for systematically inspecting connectors of optical cables by using live, still or stored images of the connectors' area.

2. Related Art and Background

Current solutions for inspecting optical fiber connectors provide a single frame image which only displays a partial view of the connector. Technicians inspecting connectors of optical cables, such as MTP connectors, generally use a camera to take a plurality of pictures/images/frames of a plurality of areas of the connector. The camera used to take images of the connector may be a fiber scope. The field of view of such camera may be smaller than the full area of a connector and an image obtained does not comprise the entire area of the connector but only a partial view of the connector. Moreover, the images and frames taken by such cameras do not comprise all the fibers or fiber-ports of the connector. The users are not provided with a method of combining all of these images and frames together for analysis and reporting.

Users of multi-fiber optical cables would like to have a full image of the connector. Accordingly, there is a need for an apparatus and a method for obtaining and displaying a full view of a multi-fiber connector, such as an MTP connector.

It is an object of the invention to provide a system, method and apparatus for automatically combining a plurality of frames showing partial views of a connector into a full image of the connector for analysis and reporting.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

In one exemplary embodiment of the invention it is disclosed an apparatus for inspecting connectors of multi-fiber optical cables. The apparatus may include a non-transitory computer readable media including a computer program or software configured to determine, via at least a processor, matching features in two or more images. The program may be further configured to combine the images such as to obtain a combined-image of the connector.

In other exemplary embodiments, it is disclosed a method for inspecting connectors of multi-fiber optical cables. The method may include receiving a plurality of images of a plurality of areas of a connector and determining, via at least a processor, matching features in two or more images. The method may further include combining the images such as to obtain a combined-image of the connector and causing a display to display the combined-image.

BRIEF DESCRIPTION OF THE DRAWING

FIG. 2 shows a combined image of a plurality of individual frames/images, according to an exemplary embodiment of the present invention.

DETAILED DESCRIPTION

Figure 1:
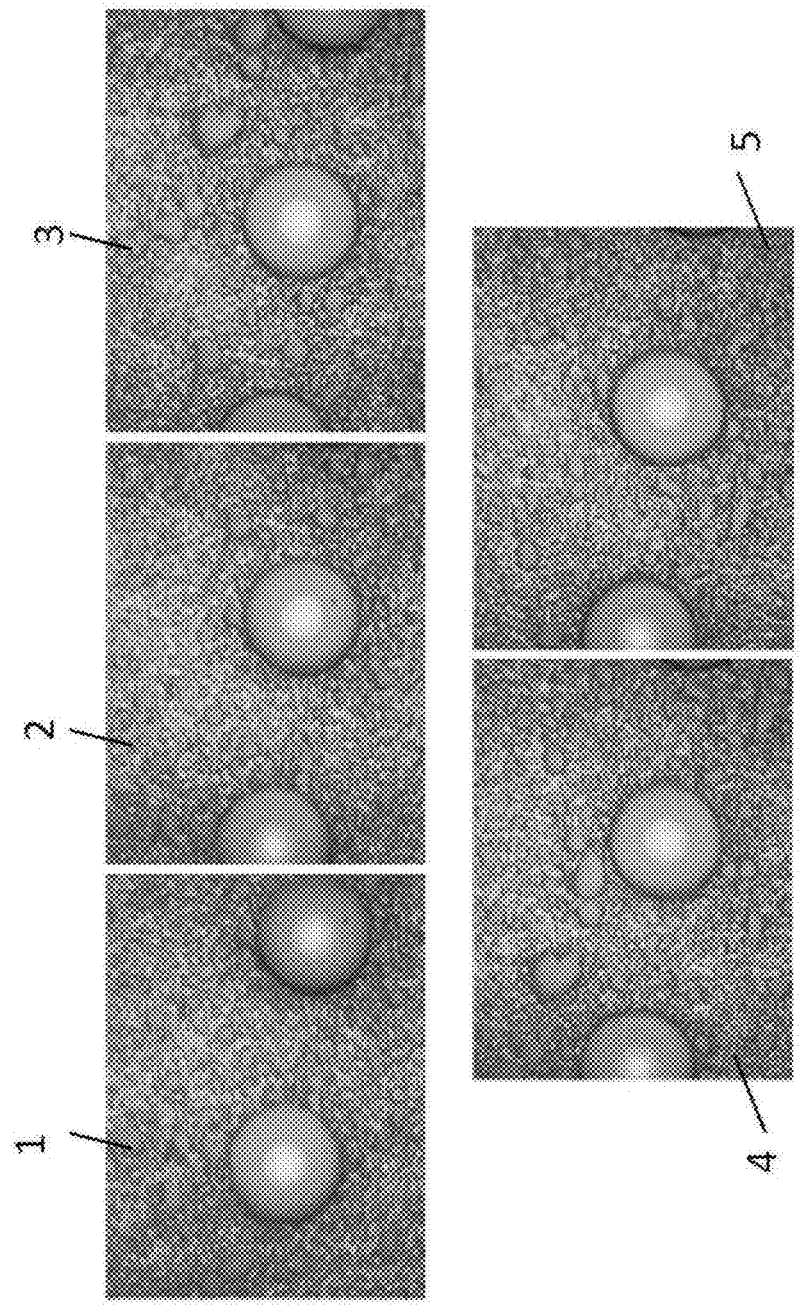
FIG. 1 shows a plurality of individual frames/images of a plurality of areas of an MTP connector, according to an exemplary embodiment of the present invention.

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Although some features may be described with respect to individual exemplary embodiments, aspects need not be limited thereto such that features from one or more exemplary embodiments may be combinable with other features from one or more exemplary embodiments.

Hereinafter, an exemplary embodiment will be described with reference to accompanying drawings.

With reference to the drawings, FIG. 1 shows a plurality of images of an MTP connector of a multi-fiber optical cable according to an exemplary embodiment of the invention. Technicians inspecting an MTP connector generally use a camera (such as a fiber scope) to take a plurality of pictures/images of a plurality of areas of the connector. The field of view of such a camera may be smaller than the full area of a connector and an image obtained does not comprise the entire area of the connector. As seen in FIG. 1, an image taken by such camera may comprise two or less fibers, while an MTP connector comprises 12 fibers.

Users of multi-fiber optical cables would like to have a full image of the connector. Accordingly, there is a need for an apparatus and a method for obtaining and displaying a full view of a multi-fiber connector, such as an MTP connector. A full image of the connector may be obtained by combining a plurality of images, such as the ones in FIG. 1, of a plurality of areas of the connector. Such images may include one or more fibers.

The invention is not limited to the type of multi-fiber optical cable, the type of connector, the number of fibers in the cable and the connector, or by the configuration or arrangement of the fibers in connectors. For example, the connectors may include any number of ports/fibers arranged in various configurations.

In an exemplary embodiment, the invention is directed to a system for inspecting connectors of multi-fiber optical cables. A user may use a camera to take a plurality of pictures/images corresponding to a plurality of different areas of a connector such as the images 1-5 in FIG. 1. The images may be stored on a computer readable media such as a memory device.

Upon inspection of various features of each of the images 1-5, it can be noticed that a certain unique feature present in one image (e.g. image 2) may also be present in another image (e.g. image 3). Unique visual characteristics of the images could be used to match features between two or more images and align the images. Common or matching features of two or more images may come from the same physical area of the connector. Features at the edge (or in the interior) of one image may be matched with features at an edge (or in the interior) of another image, thereby providing a way to align and combine the two images.

In an exemplary embodiment, FIG. 2 shows a combined image of individual images 10-14. As shown in FIG. 2, the features at the edge of image—13, such as the features in area 20, may be matched with features in the interior of image—12. Thereby, the features in area 20 can be used to align and combine with each other image—12 and image—13 by matching, aligning or overlapping the features in area 20 of image—12 with the features in area 20 of image—13. Further, the images may be aligned and combined by matching the overlapping edges of the individual fibers within the connector. Thus, image—12 and image—13 can be combined in a single image depicting an area of the connector which includes both the area depicted in image—12 and the area shown in image—13. Similarly, image—13 and image—14 include common or matching features which can be used to combine image—13 and image—14, thereby obtaining a combined image of image—12, image—13, and image—14. This way a full image of the connector, or the fibers in the connector, can be obtained by combining a certain number of images.

In an exemplary embodiment, the system may further include a computer program or software that enables a user to perform the following: to view the plurality of images on a display, to search for image features on each image, to move the images on the display with respect to each other (e.g. to translate and rotate images), to adjust the sizes of each of the images, to align and overlap two or more images over a certain area that the user choses, and to combine two or more images into a single image.

A user may use a camera to take a first image of a first-area of the connector and a second image of a second area adjacent or overlapping with the first area. The images may be stored on a memory device and displayed "live", or at a later time, on a display of a computer. The user may analyze the two images looking for matching features that may come from the same physical area of the connector. Upon finding matching features, the user may move the two images with respect to each other such as to match, align or overlap matching features and to combine the two images in an image including both the first area and the second area of the connector. The combined image may be displayed "live" or at a later time on the display. Further, the user may use the camera to take a third image, combine the third image with the combined image of the first and second images, thereby obtaining a combined image of the first, the second and the third image. This way the user can take any number of images he needs and sequentially combine them with the previous images until a full connector image is obtained.

The invention is not limited by the specific sequence in which operations or steps are performed. The matching, aligning and combining of the taken and stored images may be performed as a post-processing step. For example, the user may first take all the images and store them on a memory device. Then, at a later time and as part of a processing step, the user may analyze the images on a display and combine the images with each other. The user may combine the images with each other in any order he may chose.

The invention is not limited by the type of camera and images taken. For instance, the images may include images taken by a still camera, images taken by a video camera, such as frames of a video, or any combination therein.

The invention is not limited by the type of visual characteristics or features that can be used to combine images with each other. For example, visual characteristics of the edges of the images, visual characteristics in the interior of the image and visual characteristics of the individual fibers in the connector could be used to match features between two or more images and align the images.

In an exemplary embodiment, the system may include a computer program or software that enables a user to automatically perform the combining of images into a larger image. The computer software may include a program, such as pattern recognition program, that searches a plurality of images for common or matching features of the images. Upon finding, such common features the software may move the images with respect to each other such as to overlap, align or match the features with each other (in a manner similar to the one shown in FIG. 2). Further, the software may combine the aligned images with each other in a larger image. The aligning and overlapping of images with each other may include translating and rotating the images with respect to each other. The aligning and combining images may include changing the size or the scale of the images. The combined image may be displayed on the computer display.

The images may be combined "live" into a larger image. For instance, as each image is acquired, the acquired image is combined with the previously acquired images, or their combination, to create a single image of the connector. Thus, as new images are acquired, the images are combined with the combined-image of the previously acquired images. Thereby the combined-image builds up towards becoming a full image of the connector. The individual images may be received as streams of frames.

The individual images and the combined image may be displayed "live". For instance, the combined image may be displayed right after performing the combining of a newly acquired image to the combined-image of the previously acquired images. Thus, as more and more images are combined, a user may be able to view the combined image as it builds up towards becoming a full image of the connector. Moreover, each individual image may be displayed "live" at the time it is taken and may be displayed simultaneously with the combined image.

In an exemplary embodiment, the images may be acquired by a camera as strings/streams of frames or images. The frames may be combined "live" in a larger image. A software or computer program may analyze the combined-image, as it builds up, and may determine whether the combined-image is a full-image of the connector. If the combined-image is a full image of the connector the program may stop the acquiring of frames and may display the full image of the connector. Further, the program may display a message such as "full-connector image displayed". If the combined image is smaller than a full image of the connector the program may direct the camera to keep on acquiring frames.

Combining the images may be performed as a post-processing step. For example, the user may first take a plurality of pictures/images of the connector and store the images on a computer memory. Then the user may chose, via a computer program, the images he wants combined and may direct the computer program to automatically perform the combining of images into a larger image. A software or computer program may analyze the combined-image and may determine whether the combined-image is a full-image of the connector.

Further, the invention is not limited by the type or location of the computer readable media, the processors, the displays and the programs. For instance, various types of computer readable media may be used, such as hard disks, flash drives, volatile memory devices and others. Further, the computer readable media, the displays, the processors and the program may be located on one or more computers or on a network.

As mentioned above, although the exemplary embodiments described above are various fiber optic characterization devices, they are merely exemplary and the general inventive concept should not be limited thereto, and it could also apply to other types of fiber optic characterization devices.

What is claimed:

1. An apparatus for inspecting connectors of multi-fiber optical cables, the apparatus comprising a non-transitory computer readable media comprising a program configured to:
   determine, via at least a processor, matching features in two or more images;
   incrementally combine the images such as to obtain a combined-image of a connector; and
   determine whether the combined-image is a full image of the connector by analyzing the connector in the combined-image, wherein the combined-image comprises a first image extended from an edge of a second image, wherein incrementally combining the images continues when the image is determined to not be a full image of the connector, and wherein incrementally combining the images stops when the image is determined to be a full image of the connector.

2. The apparatus of claim 1, further comprising a camera configured to record a plurality of images of a plurality of areas of a connector.

3. The apparatus of claim 1, further comprising a display for displaying the images and the combined-image.

4. The apparatus of claim 1, wherein the program is configured to:
   receive "live" streams of images;
   automatically and "live" combine the stream of images in a combined-image of the connector; and
   cause a display to display the combined-image "live".

5. The apparatus of claim 4, further comprising a program configured to determine whether the combined-image, obtained at a certain time during receiving the "live" stream, is the full image of the connector.

6. The apparatus of claim 5, further comprising a program configured to cause a display to display the full image of the connector and to notify a user that the full image of the connector is displayed.

7. The apparatus of claim 1, wherein the camera comprises a video-camera and one or more of the images are frames of a video-recording.

8. The apparatus of claim 1, further comprising:
   storage media for storing the plurality of images;
   wherein the apparatus is configured to receive input from a user causing the apparatus to select a set of images, to match and align images of the set of images according to common features, and to combine the images in the combined-image.

9. The apparatus of claim 1, wherein the program configured to determine matching features comprises an image recognition software.

10. A method for inspecting connectors of multi-fiber optical cables, the method comprising:
    receiving a plurality of images of a plurality of areas of a connector;
    determining, via at least a processor, matching features in two or more images and incrementally combining the images such as to obtain a combined-image of the connector;
    causing a display to display the combined-image; and
    determining whether the combined-image is a full image of the connector by analyzing the connector in the combined-image, wherein
    the combined-image comprises a first image extended from an edge of a second image, wherein incrementally combining the images continues when the image is determined to not be a full image of the connector, and wherein incrementally combining the images stops when the image is determined to be a full image of the connector.

11. The method of claim 10, wherein the recording is performed by a camera comprising a video-camera and wherein one or more of the plurality of images are frames of a video-recording.

12. The method of claim 10, wherein the recording is performed by a camera comprising a still-camera and wherein one or more of the plurality of images are collected by the still-camera.

13. The method of claim 10, further comprising:
    receiving "live" streams of images from a camera, combining the stream images automatically and "live" in a combined-image, and causing a display to display the combined image "live".

14. The method of claim 13, further comprising:
    determining whether the combined-image, obtained at a certain time during receiving the "live" stream, is the full image of the connector.

15. The method of claim 14, further comprising:
    displaying the full image of the connector; and
    notifying a user that the full image of the connector has been displayed.

16. The method of claim 10, further comprising:
    storing the plurality of images as still-images and as frames of video-recordings;
    receiving input from a user to select a set of images, to align the selected images and to combine the selected images in a combined-image.

17. The apparatus of claim 1, wherein the combined-image further comprises the first image extended away from the second image such that the combined image has a greater length than any of the first image and the second image.

18. The apparatus of claim 1, wherein the combined-image further comprises a combination of a series of images, in addition to the two or more images, and
    the images, of the series of images, extend from each other and from the two or more images.

19. The apparatus of claim 18, wherein adjacent images, of the series of images, are aligned with each other at matching features contained within each adjacent image respectively.

20. The apparatus of claim 1, wherein the combined-image further comprises a plurality of images extended from both the first image and the second image.

21. The method of claim 10, wherein each of the two or more images comprises at least two fibers of a multi-fiber optical cable, and each image is of a respective area of the connector.

22. The method of claim 10, further comprising determining whether the combined-image is the full image of the connector by analyzing a number of images combined into the combined-image.

23. The method of claim 10, wherein the full image of the connector comprises a cross-sectional view comprising all fibers of a multi-fiber optical cable connected to the connector.

* * * * *